(12) United States Patent
Beugnon et al.

(10) Patent No.: US 10,396,337 B2
(45) Date of Patent: Aug. 27, 2019

(54) METHOD FOR MECHANICAL TREATMENT OF AN ELECTRICAL CONNECTION PART FOR A SECONDARY CELL

(71) Applicant: SAFT, Bagnolet (FR)

(72) Inventors: Alexandre Beugnon, Ludon Medoc (FR); Jerome Boissout, Parempuyre (FR)

(73) Assignee: SAFT, Bagnolet (FR)

( * ) Notice: Subject to any disclaimer, the term of this patent is extended or adjusted under 35 U.S.C. 154(b) by 0 days.

(21) Appl. No.: 15/082,331

(22) Filed: Mar. 28, 2016

(65) Prior Publication Data
US 2016/0285068 A1  Sep. 29, 2016

(30) Foreign Application Priority Data

Mar. 27, 2015 (FR) ...................... 15 52614

(51) Int. Cl.
*H01M 2/26* (2006.01)
*H01M 2/22* (2006.01)
*H01M 2/30* (2006.01)
*H01M 10/04* (2006.01)
*H01M 10/0525* (2010.01)

(52) U.S. Cl.
CPC ............... *H01M 2/26* (2013.01); *H01M 2/22* (2013.01); *H01M 2/30* (2013.01); *H01M 10/04* (2013.01); *H01M 10/0525* (2013.01)

(58) Field of Classification Search
None
See application file for complete search history.

(56) References Cited

U.S. PATENT DOCUMENTS

| 6,376,121 B1 * | 4/2002 | Inomata | H01M 2/26 29/623.1 |
| 2006/0040179 A1 * | 2/2006 | Bang | H01M 2/0404 429/178 |
| 2012/0321941 A1 * | 12/2012 | Kang | H01M 2/0212 429/179 |

FOREIGN PATENT DOCUMENTS

| CN | 102104134 A | 6/2011 |
| EP | 2733778 A2 | 5/2014 |
| WO | 2014/002227 A1 | 1/2014 |

OTHER PUBLICATIONS

Qingshung et al. (CN 102104134) (a raw machine translation) (Jun. 22, 2011) (Abstract, Detailed Description and Drawings).*
Inoue et al. (WO 2014002227) (a raw machine) (Jan. 3, 2014) (Abstract, Detailed Description and Drawings).*
French Search Report of Application No. 1552614 dated Aug. 17, 2015.

* cited by examiner

*Primary Examiner* — Carmen V Lyles-Irving
(74) *Attorney, Agent, or Firm* — Sughrue Mion, PLLC

(57) ABSTRACT

In a connecting part for connecting electrodes of an electrochemical cell to a current output terminal of the secondary cell, the connecting part has a surface at least a portion of which includes a plurality of indentations regularly spaced in two directions in the plane defined by the surface.

6 Claims, 4 Drawing Sheets

METHOD FOR MECHANICAL TREATMENT OF AN ELECTRICAL CONNECTION PART FOR A SECONDARY CELL

TECHNICAL FIELD

The technical field of the invention is that of surface treatment processes to improve the quality of the weld between two metal parts to be welded together using a laser.

STATE OF THE ART

Lithium-ion type secondary cell technology typically uses a copper thin foil as a support for the negative electrodes. This foil is coated with a paste comprising the electrochemically active material. The ends of the foil are not covered with electrochemically active material over a portion of a few millimeters in length. This portion is used to weld the foil to a copper connecting part the function of which is to collect current from the electrodes. This connecting part is generally in the form of a thin strip (or tongue) of copper, one end of which is welded to the negative electrodes foil while the other end is welded to a negative current output terminal of the cell, the terminal being generally also made of copper.

FIG. 1 shows schematically the principle of connection of the ends of the negative electrodes of a lithium-ion cell 1 to a negative current output terminal 2. The cell comprises a container 3 of cylindrical shape closed at one of its ends by a cover 4. The container holds an electrode plate group 5 which is obtained by winding alternating positive and negative electrodes separated by a separator. The cover serves as a support for two current output terminals, one positive terminal 6 welded directly on the cover and one negative terminal 2 passing through the cover wall and electrically insulated from the cover by a gasket 7. The positive terminal 6 is electrically connected to the positive electrodes through the container. The negative output terminal 2 is electrically connected to the negative electrodes via a connecting part 8 which is a metal tongue having a number of areas where it is bent. One end of the tongue 8a is connected to the foils of the negative electrodes. The other end 8b is connected to the negative current output terminal 2.

Welding of the ends 8a, 8b of the connecting part either to the electrodes 5 or to the negative current output terminal 2 is generally carried out using a laser. The laser beam is directed perpendicularly to the surface of the connecting part. The energy provided by the laser beam melts the contact between the end region 8a of the connecting part and the portion of the electrodes foil not covered with active material, or the contact between the other end 8b of the connecting part and the current output terminal. Solidification of the molten region of contact provides an electrical connection between the electrodes and the current output terminal. The weld must be of good quality to withstand vibration and impact experienced by the cell in use. A good quality weld aids in ensuring electrical and mechanical reliability of the cell.

However, the welding process for copper alloy or pure copper with a laser does not always give satisfactory results. Indeed, the majority of laser beams for welding metal components, of thicknesses between 0.1 millimeter and several millimeters, have a wavelength of about 1063 nm. At this wavelength, studies have shown that pure copper (type Cua1, Cub1 or Cuc1) have an absorbency (equal to 1−reflectivity) of between a few % up to about 20% maximum. Part of the energy emitted by the laser beam is no longer absorbed by the copper, the effect of which is to reduce the depth of penetration of the laser beam and reduce the efficiency of the welding process. The laser welding technique of parts in copper alloys or pure copper is therefore not preferred with respect to techniques such as ultrasonic welding or using an electrical contact.

To overcome this difficulty, it has been proposed to use a nickel part that is placed between the copper part and the laser beam to "trick" the laser and transmit thermal energy from the laser to the copper to be welded. This solution is described in EP-A-1,653,530. However, this has the disadvantage of involving one or more additional parts of nickel in the manufacture of the cell. These parts are not necessary to the operation of the cell and they increase cost, considering that they remain on the cell once it has been manufactured.

To reduce the number of parts involved in the manufacture of the cell, it has been proposed to use one single copper connecting part including a portion in which the copper is co-laminated with nickel. This solution is described in EP-A-2,093,820. The co-laminated portion can be located either at the end of the connecting part which is welded to the copper foils of the electrodes, or to the end which is welded to the foot of the copper current output terminal, or to both ends at once.

Chinese patent application CN 102,104,134 A describes a copper connecting part fixed to an electrode by compression/stamping. The compression/stamping step does not cause the melting of the copper, unlike a laser welding beam.

The following patent applications US 2006/0040179, EP 2733778 and WO 2014/002227 disclose methods for connecting parts of a lithium-ion cell. These parts are made of nickel or aluminum.

There is still a need to improve the efficiency of the welding process between two copper parts without having to use additional parts.

Furthermore, it has been found that for the same copper grade, two samples may have different degrees of shininess depending on their surface condition. The degree of absorption of a laser beam by the copper varies in inverse proportion to its shininess. The shinier the copper, the higher its reflectivity, and therefore the lower the amount of energy absorbed. If the amount of energy absorbed by the copper is insufficient to cause the melting of the contact region between the two parts to be welded, welding does not occur. An operator should thus normally adjust the power of the laser beam depending on the degree of shininess of the copper part receiving the laser beam. In practice, this adjustment is not made and the laser is simply set at maximum power. A way is consequently needed of avoiding using the laser at full power and to have available a margin for adjusting power.

SUMMARY OF THE INVENTION

To this end, the invention provides a connecting part for connecting electrodes of a secondary cell to a current output terminal of the secondary cell, said connecting part having a surface at least a portion of which comprises a plurality of indentations regularly spaced apart along two directions in a plane defined by said surface.

According to one embodiment, the connecting part is a metallic thin strip having two faces, the first face comprising the plurality of indentations and the second face being adapted to be welded to the current output terminal.

According to one embodiment, the indentations have a triangular, semicircular, trapezoidal, rectangular or square cross section, for a view in cross section of the connecting part. Preferably, the indentations have a triangular section.

According to another embodiment, the indentations are spaced apart by the same distance.

According to another embodiment, the depth of the indentations is greater than or equal to 50 µm, preferably greater than or equal to 100 µm.

According to another embodiment, the area of each indentation measured at connecting part surface level is greater than $10^{-2}$ mm$^2$.

According to another embodiment, the connecting part comprises copper or a copper based alloy.

According to another embodiment, the surface comprising the plurality of indentations has been obtained by punch indentation.

The invention also provides a secondary cell comprising the above connecting part.

In one embodiment, the secondary cell comprises a current output terminal comprising copper or a copper based alloy.

According to another embodiment, the connecting part comprises copper or a copper based alloy and is welded by laser welding to:
 at least one foil comprising copper or a copper-based alloy of an electrode of the secondary cell and/or
 a current output terminal comprising copper or a copper-based alloy.

According to another embodiment, the secondary cell is of the lithium ion type.

The invention also provides a method of making an electrical connection between:
 a connecting part and at least one foil of an electrode of a secondary cell and/or
 a connecting part and a current output terminal of the secondary cell, said method comprising the steps of:
 a) providing a connecting part,
 b) creating by punch indentation, a plurality of indentations on at least a portion of a surface of the connecting part, the indentations being spaced regularly in two directions in a plane defined by the surface;
 c) contacting a surface of the connecting part, opposite to the surface having undergone punch indentation, with a current output terminal of the secondary cell and/or at least one foil of an electrode of the secondary cell,
 d) emitting a laser beam directed on the surface of the connecting part having undergone punch indentation.

In one embodiment,
 the connecting part comprises copper or a copper-based alloy;
 the current output terminal and/or foil of the electrode comprises copper or a copper-based alloy;
 the indentations are of triangular section, for a view in cross section of the connecting part.

In one embodiment, an area of the punch indented portion is greater than or equal to an area of the surface receiving the laser beam in step d).

The invention consists in mechanically changing the surface state of the connecting part, preferably made of copper, by performing, at the location of the weld region, for example by a punch indentation process, a plurality of regularly spaced indents or indentations. The presence of these indentations has the effect of increasing the percentage of heat energy absorbed by the connecting part and thus increasing the energy transmitted to the area for fusion welding.

DETAILED DESCRIPTION OF PREFERRED EMBODIMENTS

The invention consists in creating, in the surface of the connecting part, a plurality of regularly-spaced indentations in at least two directions, located in the plane defined by the surface of the connecting part. This plurality of indentations can be obtained by punch indentation of at least a portion of the surface of the connecting part. Different shapes of indentations can be envisaged depending on the shape of the punch used, among which we can mention pyramidal, hemispherical, trapezoidal, parallelepiped or cubic. The pyramid shape is preferred. The base of the pyramid can be a regular polygon of 3, 4 or 5 sides. Preferably, the pyramid is a square pyramid (with a base having four sides) because this shape provides better reduction of the reflection of the laser beam and therefore better absorption.

By the term "regularly spaced indentations on the surface of the connecting part" there is meant a repetition of the indentations spaced at the same distance. This provides a homogeneous surface state of the connecting part.

Figure 2:
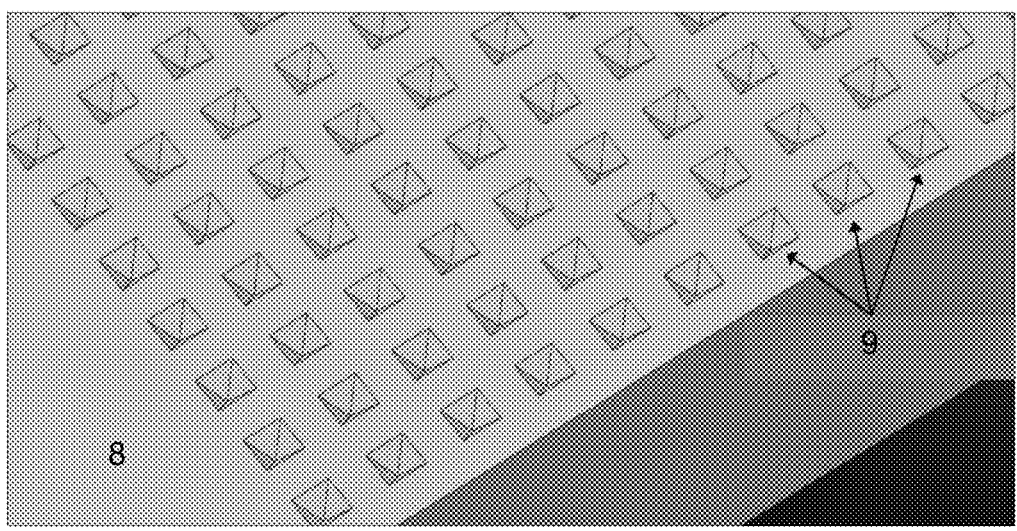
FIG. 2 shows schematically, on an enlarged scale, the surface of a connecting part being stamped by a pyramidal four-sided punch.

FIG. 2 shows schematically, after magnification, the surface of the connecting part 8 being stamped by a pyramidal punch having four sides. The indentations 9 of pyramidal shape are regularly spaced on the surface of the connecting part. The section of the indentation 9 is triangular in shape, for a view in cross section of the connecting part.

Figure 3A:
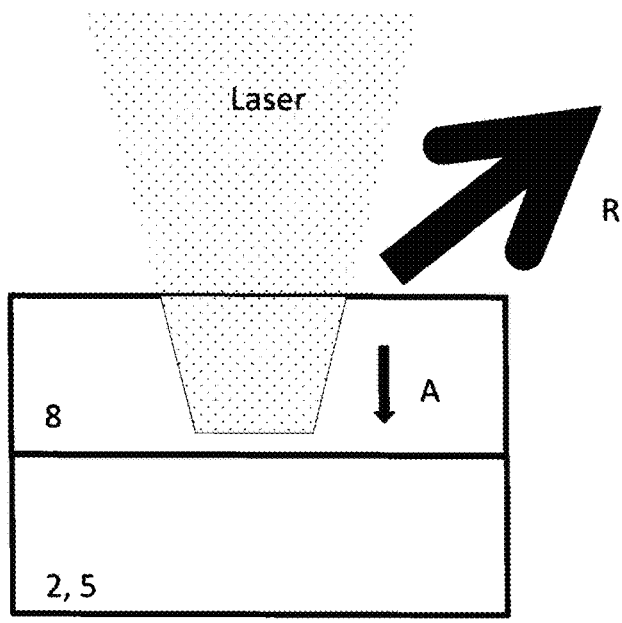
FIG. 3a is a diagrammatic representation of reflected energy and energy absorbed by the connecting part in the case where the surface thereof has not been modified.
Figure 3B:
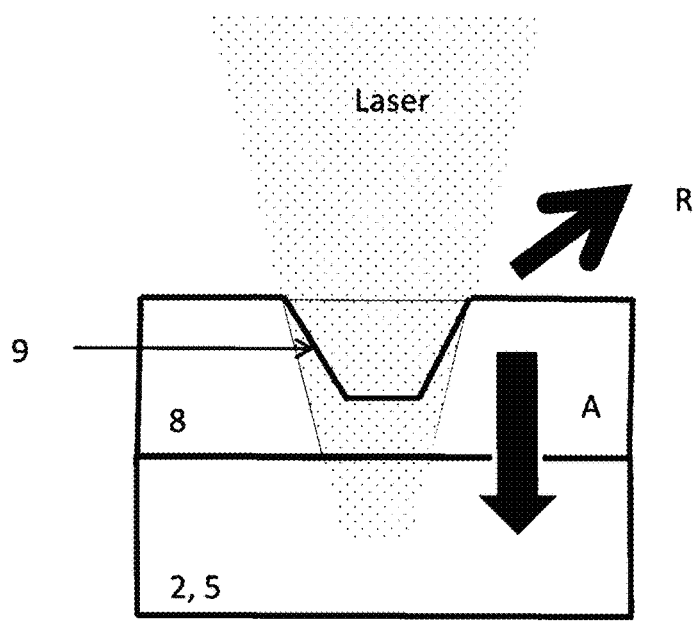
FIG. 3b is a diagrammatic representation of reflected energy and energy absorbed by the connecting part in the case where it has been punch indented using a pyramidal punch.

By modifying the surface state of the connecting part, it has been discovered that the reflection of the laser beam by the connecting part was reduced and therefore the amount of heat energy absorbed by the latter was increased. FIGS. 3a and 3b illustrate this phenomenon. In FIG. 3a, there can be seen an upper portion which symbolizes the connecting part 8 and a lower portion which symbolizes either the negative output terminal 2 or the end of a negative electrode foil 5. The laser beam arrives almost perpendicularly at the connecting part. Due to the shininess of the connecting part, a significant portion of the laser energy is reflected (R). The amount of absorbed energy (A) is insufficient to cause the melting of the contact area between the top portion and the bottom portion. In the situation illustrated in FIG. 3b, the connecting part has undergone a punch indentation operation. The section of the indentation 9 formed by the punch is of a trapezoidal shape, when viewed in a cross section of the connecting part. This figure shows that the energy absorbed extends down to the lower part thereby allowing fusion of the portions above and below the location of the contact region.

The indentations formed on the connecting part preferably have a depth greater than or equal to 50 µm, preferably greater than or equal to 100 µm.

Preferably, the area of each indentation measured at the connecting part surface level is above $10^{-2}$ mm$^2$. For example, in the case of a pyramid-shaped punch, the indentation produced by the punch on the connecting surface of the connecting part is a square whose side may be of at least 100 µm.

In one embodiment, the distance between the closest edges of two adjacent indentations is constant. Preferably, the distance between the closest edges of two adjacent indentations is 1 µm to 100 µm.

The distribution of the indentations on the connecting part surface is homogeneous. The invention therefore excludes a mechanical treatment of the surface of the connecting part which would confer a random distribution of the indentations. Such is the case of a surface treatment by abrasion or polishing, or by punching using a punch whose surface has been pretreated by electro-erosion.

The connecting part has most frequently the form of a thin metal strip, with a thickness ranging from 500 µm to 1 mm, preferably of 520 µm to 640 µm.

Preferably, the connecting part and the part to which the connecting part is to be welded are made of copper or a copper based alloy. Copper can be of the type Cua1 (Cu-ETP, purity: 99.9% copper minimum), of the type Cub1 (Cu-DHP purity of 99.9% copper minimum, residual presence of phosphorus) or of type Cuc1 (Cu—OF, deoxidized, 99.95% copper minimum purity).

The punch indentation operation is practiced on the face of the thin strip for receiving the laser beam during the subsequent welding step. The side opposite to that receiving the laser beam is that which is to be welded. By the term opposite side we mean the side of the connecting part which is situated in a plane parallel to the face receiving the impact of the laser beam and which would be traversed by the laser beam if we were to extend fictitiously the laser beam path.

Figure 1:
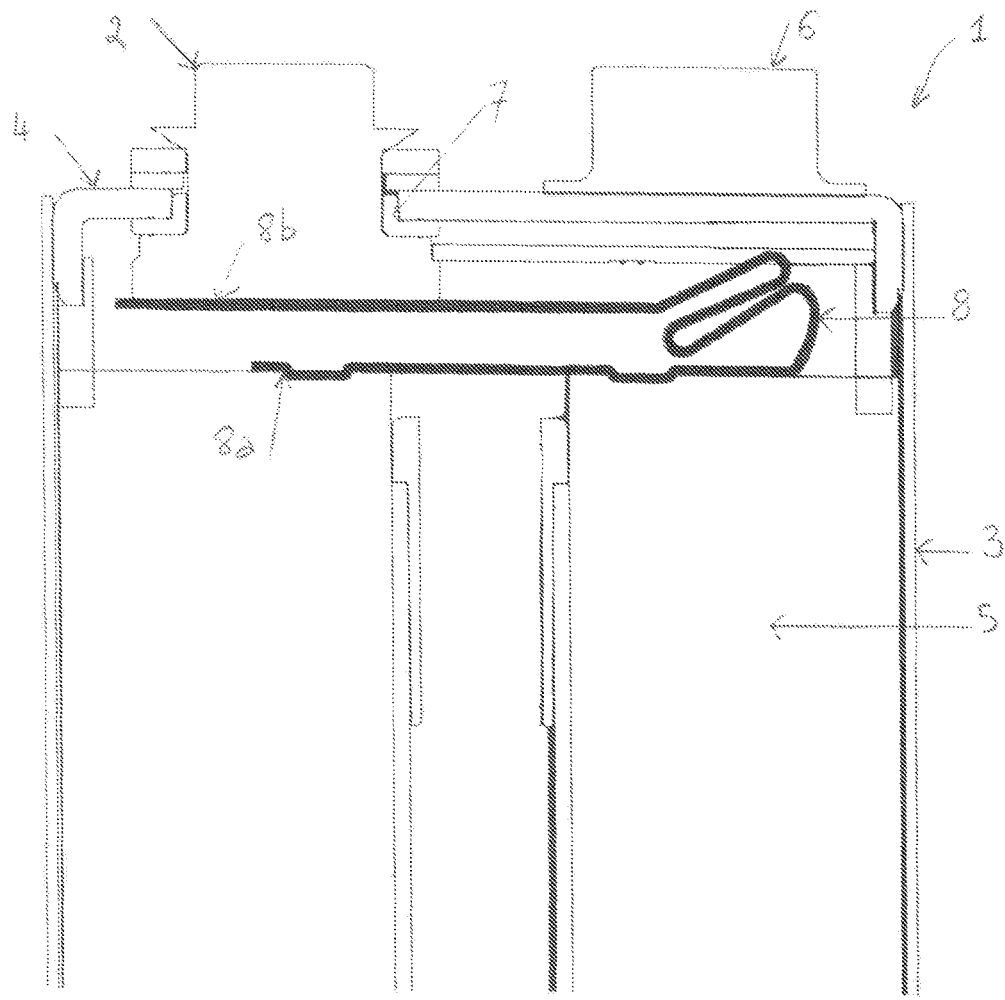
FIG. 1 shows schematically the connection of the ends of the negative electrodes of a lithium-ion cell to a negative current output terminal.

The punch indentation can be performed at the end of the connecting part designed to be welded either to the current output terminal, that is to say the end 8b in FIG. 1, or to the end of the foils of the electrodes not covered with electrochemically active material, that is to say the end 8a in FIG. 1. In one embodiment, punch indentation is performed at the two ends 8a and 8b.

After punch indentation, the welding step may be performed using an Nd:YAG (yttrium-aluminum garnet doped with neodymium) laser of the continuous type having an IR 1063 nm wavelength beam. The appearance of a weld produced by laser is readily distinguishable from that of a weld produced by other welding techniques, such as ultrasound welding or resistance welding. Indeed, when welding is performed using a laser beam, a melt line is observed the pattern of which corresponds to the displacement of the laser beam. However, when welding is performed by ultrasound, the welded portion shows crushing of material without fusion. When welding is performed by resistance welding, the points of fusion can be distinguished. The skilled person can therefore easily, by simple observation of the weld region, differentiate whether the weld was performed by laser, by ultrasound or by resistance welding.

The above description of the invention has been made in the particular case of the embodiment of an electrical connection between a connecting part and a current output terminal or the end of the electrode foils. However, the method according to the invention is not limited to performing such connections and also applies to the making of any electrical connection between two parts of metal, preferably copper, of the cell.

The main advantage of the invention is to allow a reduction in the amount of energy required to achieve the same quality of weld.

One benefit arising out of this main advantage is that of less heating of the cell components located close to the weld area, thus reducing the risk of damage by burning.

Another benefit resulting from this is that of increasing the welding process adjustment margin, that is to say, it is possible to increase the laser power if necessary. Indeed, until now, variability in the as delivered condition of the connecting part led to heterogeneous quality welds between batches. This variability required the operator to use a very high welding power close to the maximum power of the laser. The invention makes it possible to retain a power margin.

The weld obtained by the method according to the invention is of good quality, i.e. it resists vibrations and impacts affecting the cell during its use. The cell that includes such a weld thus has better mechanical and electrical reliability.

EXAMPLES

Test A (Comparative Test)

Figure 4:
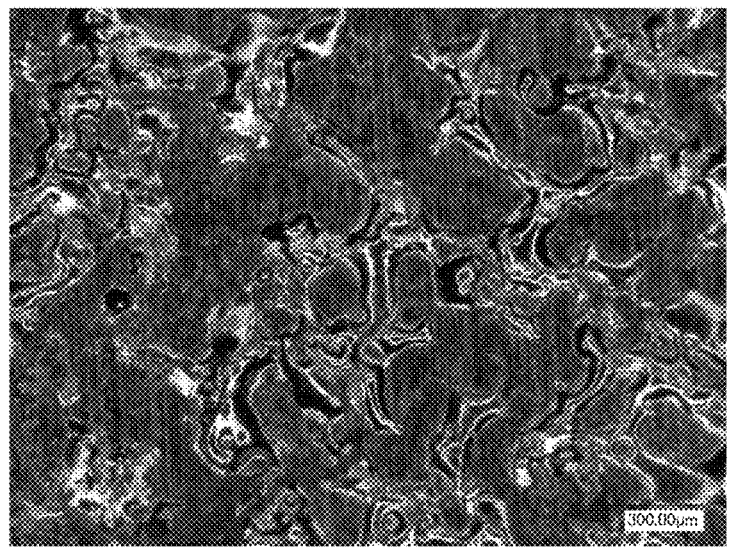
FIG. 4 shows, at a magnification of about 200 times, a view of the surface of a connecting part that has undergone mechanical treatment by stamping to increase the surface roughness of the part to be welded. The punch was treated by electro-erosion. This method is not part of the invention.

A copper connecting part was subjected to mechanical treatment allowing to locally increase the roughness of its surface. This was a stamping treatment, wherein the surface of the punch had been treated by electro-erosion. The formation of a heterogeneous roughness was observed. The roughness (Ra, arithmetic mean of the absolute values) obtained was between 1.3 µm and 2.7 µm. FIG. 4 shows a view obtained with an optical microscope of the surface of the connecting part after treatment. The indentations have a random arrangement. The connecting part was welded by laser to a copper part. The weld obtained was not satisfactory.

Test B

Welding tests were carried out on:
seven copper connecting parts untreated (standard).
seven copper connecting parts which had undergone surface treatment in the form of punch indentation using a pyramidal punch (as per the invention).

Table 1 below shows the average of the results obtained. It shows that punch indentation allows a significant improvement in weld length.

TABLE 1

| | Average weld length (mm) | Minimum weld length (mm) | Maximum weld length (mm) |
| --- | --- | --- | --- |
| Standard | 23.47 | 11.29 | 35.40 |
| According to the invention | 33.33 | 24.80 | 36.00 |

Test C

Welding tests were carried out on:
Samples of connecting parts with a copper grade CuC1, with a low absorption coefficient and not subjected to punch indentation (standard);
Samples of connecting parts having a CuC1 copper grade which had undergone punch indentation using a pyramidal punch on the weld area. The cross section of the indentation 9 was triangular in shape, for a view in cross section of the connecting part.

Figure 5:
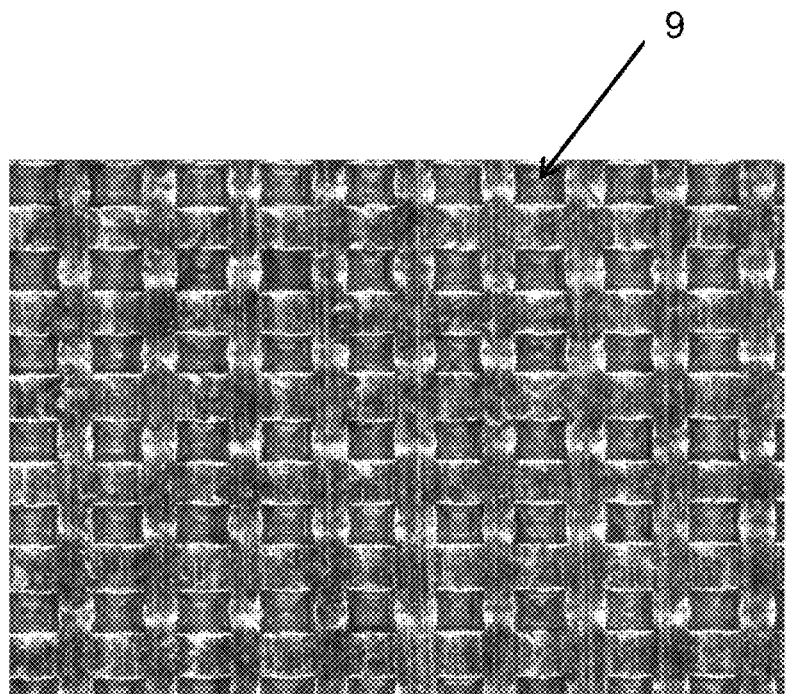
FIG. 5 shows, at a magnification of about 200 times, a view of the surface of a connecting part that has undergone mechanical treatment using punch indentation according to the invention.

FIG. 5 shows a view of the surface of these connecting parts. The plurality of indentations 9 which are regularly spaced is visible.

In a first series of comparative weld tests, we quantified the increase in the length of weld as a result of punch indentation. The welding parameters are identical for both types of samples and welded lengths are measured and compared. The tests were performed on 10 standard samples and 20 samples having undergone punch indentation using a pyramidal punch In a second series of tests, a so-called "sensitivity tests", the minimum energy level was measured required to achieve a complete weld bead, as required, using the standard samples and the parts treated with the pyramid-shaped indentations. This minimum energy level reflects the ability of copper to absorb the laser beam. The purpose of this second series of tests was to compare the minimum energy levels required to obtain correct welding. This series was produced by starting welding with a low laser power. Then, while maintaining all other welding parameters unchanged (speed, focal length, geometry . . . ), the welding power was incremented by 100 W until a complete weld section was achieved. The second series of tests was performed on eight standard samples and 35 samples having undergone punch indentation using a pyramidal punch.

Results:

The first set of test was used to demonstrate the effectiveness of the pyramidal punching treatment with 100% of the seam length welded as per the nominal specification. The standard samples had for their part an average length of 73% of welded seam, with in particular one sample which only welded to an extent of 13.9%. (Table 2)

TABLE 2

| Sample No. | Surface state | Percentage of welded length of sample relative to the nominal specification (%) |
|---|---|---|
| 1 | Standard | 86.1 |
| 2 | Standard | 63.9 |
| 3 | Standard | 83.3 |
| 4 | Standard | 100.0 |
| 5 | Standard | 13.9 |
| 6 | Pyramidal punch | 100.0 |
| 7 | Pyramidal punch | 100.0 |
| 8 | Pyramidal punch | 100.0 |
| 9 | Pyramidal punch | 100.0 |
| 10 | Pyramidal punch | 100.0 |
| 11 | Standard | 97.2 |
| 12 | Standard | 77.8 |
| 13 | Standard | 100.0 |
| 14 | Pyramidal punch | 100.0 |
| 15 | Pyramidal punch | 100.0 |
| 16 | Pyramidal punch | 100.0 |
| 17 | Pyramidal punch | 100.0 |
| 18 | Pyramidal punch | 100.0 |
| 19 | Pyramidal punch | 100.0 |
| 20 | Pyramidal punch | 100.0 |
| 21 | Pyramidal punch | 100.0 |
| 22 | Pyramidal punch | 100.0 |
| 23 | Pyramidal punch | 100.0 |
| 24 | Pyramidal punch | 100.0 |
| 25 | Standard | 72.2 |
| 26 | Standard | 36.1 |
| 27 | Pyramidal punch | 100.0 |
| 28 | Pyramidal punch | 100.0 |
| 29 | Pyramidal punch | 100.0 |
| 30 | Pyramidal punch | 100.0 |
| Mean for samples having undergone punch indentation with a pyramidal punch | | 100 |
| Mean for standard samples | | 73.06 |
| Minimum for standard samples | | 13.9 |

The second series of tests was used to compare the minimum energy levels required for a weld compliant with specifications.

The tests with the standard samples did not allow to obtain a weld length consistent with the welding parameters for this test: Table 3 below indeed shows that on the one hand weld appearance is not consistent, and secondly that the weld length is at most 95% of the length of a nominal weld for a power of X+700 W. Only a laser power of X+1300 W provided a consistent weld. Now, this power is the maximum power of the laser used. The adjustment margin in the process is consequently zero.

On the other hand, tests carried out on samples that had undergone punch indentation showed it is possible to obtain a compliant weld starting from X+400 W, in other words well below X+1300 W. Table 3 shows that the appearance of the weld conforms to specifications for power values ranging from X+400 W to X+700 W. In addition, the weld length is always equal to 100% for a power situated in this range.

TABLE 3

| | Test 1 X Watts + 700 Watts | | Test 2 X Watts + 600 Watts | | Test 3 X Watts + 500 Watts | | Test 4 X Watts + 400 Watts | |
|---|---|---|---|---|---|---|---|---|
| | appearance | Weld length | appearance | Weld length | appearance | Weld length | appearance | Weld length |
| S* | non-compliant | 95% | non-compliant | 95% | non-compliant | 90% | non-compliant | 90% |
| P** | compliant | 100% | compliant | 100% | compliant | 100% | compliant | 100% |

TABLE 3-continued

| | Test 5 X Watts + 300 Watts | | Test 6 X Watts + 200 Watts | | Test 7 X Watts + 100 Watts | | Test 8 X Watts | |
|---|---|---|---|---|---|---|---|---|
| | appearance | Weld length | appearance | Weld length | appearance | Weld length | appearance | Weld length |
| S* | non-compliant | 90% | non-compliant | 85% | non-compliant | 70% | non-compliant | 15% |
| P** | non-compliant | 95% | non-compliant | 90% | non-compliant | 85% | non-compliant | 50% |

*S = Standard
**P = pyramidal punch

The invention claimed is:

1. A lithium-ion secondary cell comprising a connecting part for connecting electrodes of the secondary cell to a current output terminal of the secondary cell, said connecting part having:
- a first surface at least a portion of which comprises a plurality of indentations regularly spaced apart along two directions in a plane defined by said first surface, and
- a second surface opposite, in a vertical direction, to the portion of the first surface, comprising the plurality of indentations,
- wherein the connecting part comprises a copper or a copper-based alloy and is welded by laser welding to:
  - at least one foil comprising a copper or a copper-based alloy of an electrode of the secondary cell, an end of the at least one foil being not covered by any electrochemically active material or
  - a current output terminal comprising a copper or a copper-based alloy,
- the second surface being welded with either the current output terminal or the end of the at least one foil, and being flat and entirely devoid of protrusions,
- wherein the weld between the second surface of the connecting part and the current output terminal or the end of the at least one foil corresponds to a displacement of a laser beam, and
- wherein the indentations have a square pyramidal shape for a view in a cross section of the connecting part.

2. The secondary cell according to claim 1, in which the connecting part is a metallic strip.

3. The secondary cell according to claim 1, wherein the indentations are spaced apart by the same distance.

4. The secondary cell according to claim 1, wherein the depth of the indentations is greater than or equal to 50 μm, preferably greater than or equal to 100 μm.

5. The secondary cell according to claim 1, wherein the area of each indentation measured at connecting part surface level is greater than $10^{-2}$ mm$^2$.

6. The secondary cell according to claim 1, wherein the first surface comprising the plurality of indentations has been obtained by punch indentation.

* * * * *